Feb. 7, 1961     E. M. M. P. JEANTIL     2,970,599
GRAIN CLEANING DEVICE FOR THRESHING MECHANISMS
Filed June 18, 1958     3 Sheets-Sheet 1

INVENTOR:
EMILE MATHURIN MARIE PROSPER JEANTIL

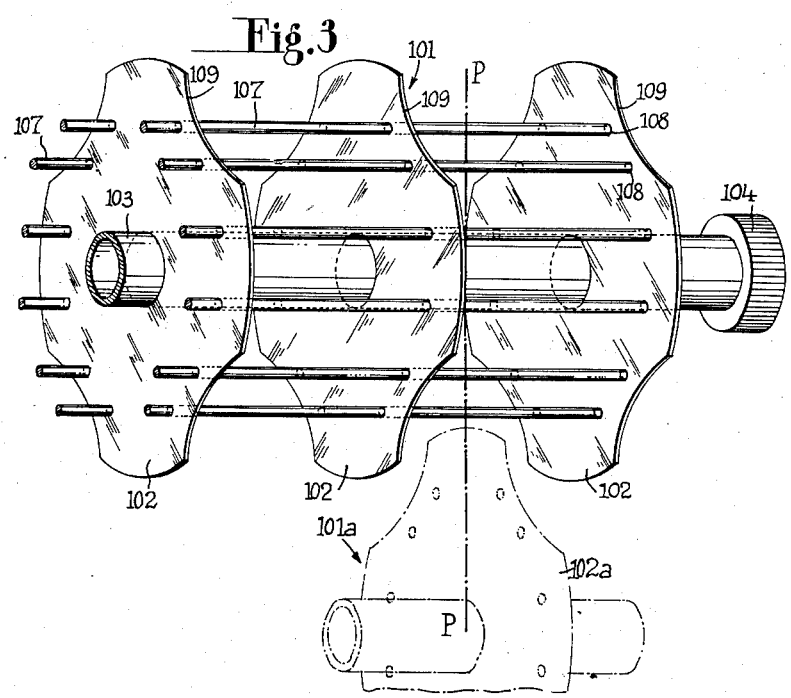

Feb. 7, 1961 E. M. M. P. JEANTIL 2,970,599
GRAIN CLEANING DEVICE FOR THRESHING MECHANISMS
Filed June 18, 1958 3 Sheets-Sheet 3
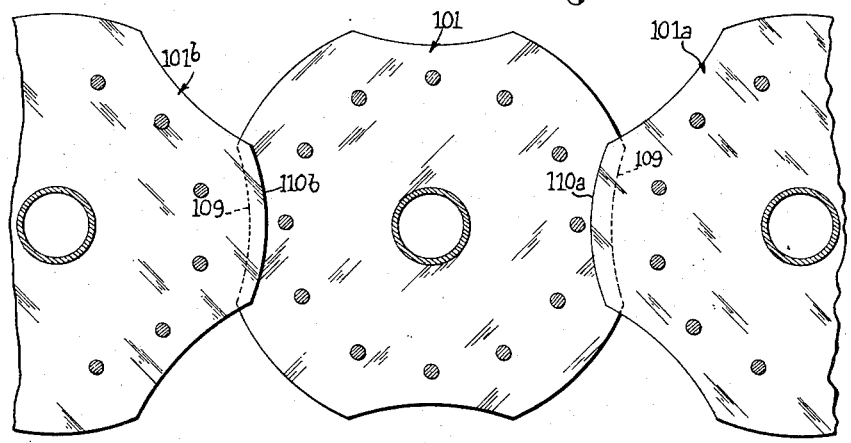
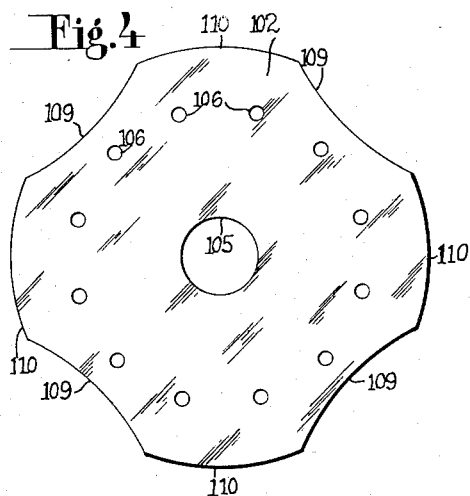
INVENTOR:
EMILE MATHURIN MARIE PROSPER JEANTIL

United States Patent Office

2,970,599
GRAIN CLEANING DEVICE FOR THRESHING MECHANISMS

Emile Mathurin Marie Prosper Jeantil, Rte. de l'Hermitage (Ille-et-Vilaine), Mordelles, France Filed June 18, 1958, Ser. No. 742,802

Claims priority, application France June 21, 1957

2 Claims. (Cl. 130—27)

The invention relates, in a general way, to thresher mechanisms for threshers and harvester-threshers, and more particularly, to grain cleaning devices which are a large part of these mechanisms.

The object of the invention is to provide a thresher machine comprising a grain cleaning device and feeding device which operate in a very satisfactory manner even when the machine functions on steeply inclined ground. It is known that in machines of known type, especially in harvester-threshers, these conditions of operation often result in clogging or cramming and loss of grain, since these machines are very often designed for use on flat horizontal ground. The machine of the invention does not have these disadvantages.

The machine of the invention comprises following on the conventional thresher cylinder and separating means such as straw-walkers, a conveyor and feed device comprising a positive conveyer device preferably constituted by one or more Archimedean screws rotating in suitable directions so as to convey the grain above the cleaning device, and the latter comprises, on the one hand, instead of the conventional shaking grids or screens a rotary grid or screen consisting of a series of adjacent parallel rollers driven in rotation in the same direction and, on the other hand, below said rotary grid, a very light oscillatory grid or screen.

According to another feature of the invention, at the outlet end of the rotary grid, the fraction of grain imperfectly cleaned and mixed with chaff and husk and remaining on the rotary grid falls on the endless screw which conveys it to a recycling circuit toward the threshing cylinder, whereas the cleaned grain having passed through the roller grid and the oscillatory grid is received by another endless screw which conveys it to the sack filling device of the machine.

According to another feature of the invention, the cleaning device comprises, as known per se, a fan, the latter being of an improved axial suction type in the form of a snail or spiral which contains in the same housing two separate shells fed by a single rotor, the separation of the air sent into the two shells being effected inside the housing, the outer shell feeding the upper face of the oscillatory grid and the lower shell feeding the lower face of the oscillatory grid.

In a particular embodiment of the invention each of the rollers of the rotary grid comprises a number of bars disposed about a geometric axis so as to form a cylindrical cage, means for maintaining said bars spaced apart from one another, said spacing being such as to retain the fractions of imperfectly cleaned grain while allowing passage of the cleaned grain and the air issuing from the fan, said roller further comprising transverse plates rigidly maintained spaced from one another.

Further features and advantages of the invention will be apparent from the ensuing description, with reference to the accompanying drawings, to which the invention is in no way restricted.

In the drawings:

Fig. 3 is an enlarged perspective view of a portion of one embodiment of a roller of the grid;

Fig. 4 is a front elevational view of a plate constituting one of the elements of said roller; and Fig. 5 is a partial end elevational view of the improved grid comprising rollers of the type shown in Fig. 3, and showing notably the dispositions of three consecutive rollers.

In the embodiment shown in the figures, the harvester-thresher machine comprises, as known per se, a rotary thresher cylinder 1 which could be driven by a power take-off or an independent motor, and a fixed concave 2 through which the grain separated from the straw passes. The straw, which could still contain a part of the grain, is driven by a straw walker 3 consisting, as known per se, of a stepped oscillatory table on which the straw is driven out of the machine in the direction of arrow $F_1$.

Figure 1:
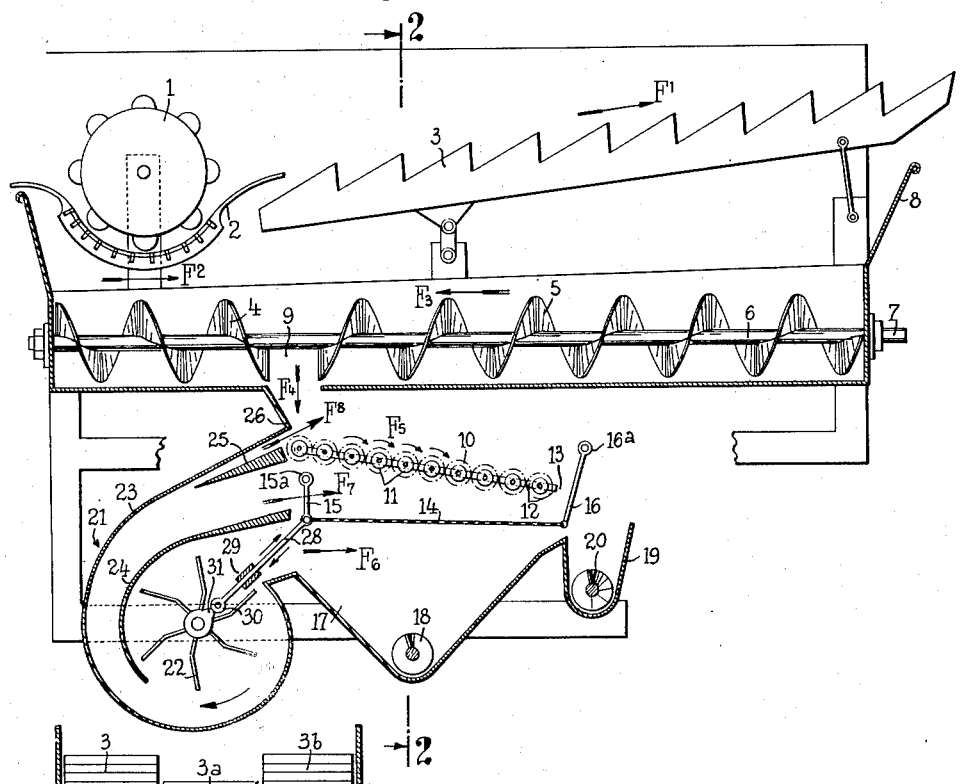
Fig. 1 is a diagrammatic elevational view of the part of the harvester-thresher machine of the invention which comprises the improved grain cleaning device.
Figure 2:
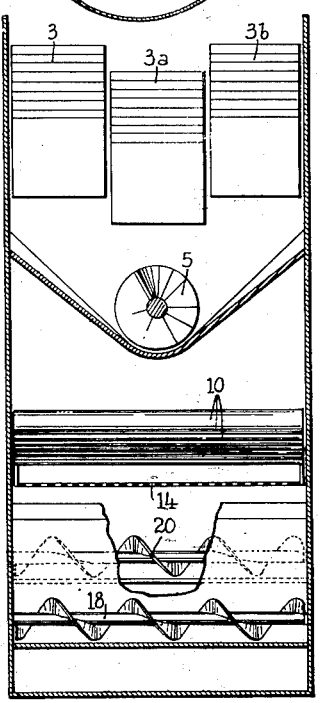
Fig. 2 is a sectional view taken along line 2—2 of Fig. 1.

This machine could comprise a plurality of adjacent straw walkers. For example, as shown in Fig. 2, the machine comprises three straw walkers 3, $3^a$, $3^b$ the movements of which are staggered in time. At the free end of these straw walkers (the right end as viewed in Fig. 1) the straw falls from the straw walker out of the machine and the grain which passes through the straw walkers falls on the conveyor and feed device which therefore receives, firstly, grain from the concave and, secondly, grain from the straw walkers, this grain being mixed with husk and chaff.

According to a feature of the invention, the conveyor and feed device comprises Archimedean screws 4 and 5. Two screws have been shown in the drawings mounted on the same shaft 6 which is driven at one end 7 by a counter-shaft driven by a transmission belt connected directly or indirectly to the thresher cylinder. The shaft 6 rotates in a trough 8 which receives the grain from the concave and the straw walker, and these two screws whose helical blades have opposite leads or helices are driven in such direction that the grain is fed in the direction of arrow $F_2$ and in the direction of arrow $F_3$ to a gap 9 between the two grids through which gap it falls (arrow $F_4$) onto the cleaning device which will now be described.

This cleaning device comprises a rotary grid 10 or screen constituted by a number of rollers 11 which are in parallel spaced relationship so as to permit only the passage of the grain. They are all supported by a chassis 12 in which they are rotatably mounted and are driven in rotation in the same direction (arrow $F_5$) by a driving device (not shown in the drawings). These rollers could comprise for example at the ends of their shafts sprockets driven by a chain. This grid is inclined downwardly in the direction from the input end of this grid located below the gap 9 to its opposite end 13. Disposed below said rotary grid is an oscillatory grid 14 or screen constituted by a very light metal grid formed for example of one millimetre thick perforated sheet metal. This grid 14 is for example suspended from two arms 15 and 16 which pivot about two fixed pivots $15^a$, $16^a$ and can be actuated by a power take-off or the motor which actuates other moving elements of the machine. Disposed below the grid 14 is a hopper 17 which receives the cleaned grain which has passed through the grid 14, and disposed at the bottom of this hopper is a screw or worm 18 which conveys the grain to the sack-filling device. Disposed below the ends 13 of the rotary grid and the oscillatory grid is another hopper 19 at the bottom of which is provided a screw or worm 20 which receives the grain, waste and husk which were unable to pass through these grids and which conveys the grain to a recycling circuit which returns it to the thresher cylinder.

Said cleaning device comprises a special fan 21 in the form of a snail or spiral and having a single-bladed rotor 22 fed with air through an axial pipe (not shown in the drawing). The rotor rotates inside a housing 23, in the form of a snail or spiral and having a single-bladed rotor of a spiral, which terminates in the region of the grid 14, divides the wind into two streams respectively directed below and above the grid 14. A second small inner partition 25 terminates on a level with the rotary grid and the outer wall terminates at 26 above said grid. Thus the wind is divided into three streams, the first being directed below the grid 14 in the direction of arrow $F_6$, the second directed below the rotary grid in the direction of arrow $F_7$, and the third above the rotary grid in the direction of arrow $F_8$.

Preferably, the grid 14 is actuated by a rod or a pair of rods 28 which slide in fixed guides 29 and bear at 30 against a cam 31 carried by the shaft of the rotor 22, an oscillatory movement being imparted for each rotation of the rotor to the oscillating assemblage consisting of the grid 14 and the suspension rods 15 and 16.

The operation of this machine and its advantages will be clear from the foregoing desciption.

The grain mixed with chaff and husk passing through the concave is conveyed by the screw 4 to the gap 9 whereas that which passes through the straw walkers is also conveyed by the screw 5 to the gap 9. The grain then falls onto the grid 10 where it is driven by the rotating rollers toward the right end of the grid 10 as viewed in Fig. 1.

It will be observed that this feed of the grain due to the rotation of the rollers 11 could be considered as a substantially positive feed, the inclination of the machine having but little effect on this feed. Thus, whatever the nature of the ground, the machine can operate without clogging.

After the grain has passed through the gap 9 it is subjected to a first stream of air in the direction of the arrow $F_8$ in the course of falling and, in the course of moving along the grid 10, it passes through the latter and falls onto the grid 14 and is subjected to the action of the second stream of air in the direction of arrow $F_7$. After having passed through the grid 14 it is subjected to the action of the third stream of air in the direction of arrow $F_6$ before reaching the conveyor screw 18.

The chaff and husk separated by the streams of air are expelled in the known manner. The grain mixed with husk and chaff which was unable to pass through the grids is received at 19 and recycled as mentioned hereinbefore.

It can be seen that the material to be cleaned arrives at the same region and always follows the same path along the grids and is always subjected to the action of the stream of air in the same manner.

No loss of grain can occur as a result of grain remaining on one of the elements with consequential overflow.

It can also be seen that certain elements, which in conventional machines effect oscillating forward and backward movements, are replaced by rotating elements on the operation of which the inclination of the machine in either direction has practically no effect.

In a particularly advantageous embodiment shown in Figs. 3–5, the grid 10 consists of a series of rollers such as rollers 101. Such a roller comprises a series of plates 102 evenly spaced along an axial tubular shaft 103 and fixed on the latter, for example by welds. The shaft 103 supports at its ends a gear 104 which is adapted to be driven by a chain which drives successively all the gears of the different rollers. This chain could be replaced by any other device which drives the rollers in the same direction.

The plates 102 are identical to one another and could have any shape. In the illustrated embodiment, they consist of generally circular rigid metal discs and have an axial hole 105 and a series of holes 106 disposed on a circle concentric with the hole 105. Disposed in the holes 106 are rectilinear metal rods 107 which extend successively through all the corresponding holes of the discs, these rods being parallel with the shaft 103.

The rods extend along the whole length of the roller and terminate at 108 in end discs to which they are secured by for example welds, riveting, or screw-threads and nuts. In this way there is obtained a cage-like assemblage similar to a squirrel cage divided into compartments by the plates 102 which extend beyond the geometric cylinder on which the rods 107 are disposed. The rods are spaced apart from one another a distance which is sufficient for stopping the imperfectly cleaned grain while allowing through the cleaned grain.

The discs are provided on their periphery with a number of notches 109 evenly distributed along the periphery as shown in Fig. 4. Thus the periphery of these discs consists of a series of evenly-spaced hollows and projections 110.

In each roller the discs are all disposed in such manner that all the notches 109 are in alignment in the direction parallel with the axis of the roller, the same being true for the projection 110.

Two adjacent rollers disposed parallel with one another as described hereinbefore are so constructed and arranged that each of the discs, such as the discs 102$^a$ of one roller 101$^a$ (Fig. 3) is situated in a plane P—P midway between two consecutive discs such as discs 102—102 of the adjacent roller, such as the roller 101.

Further, the gears of two consecutive rollers are so engaged with the roller driving means that the hollows 109 of one roller, such as roller 101 (Fig. 5) are constantly facing projections, such as projections 110$^a$, 110$^b$, of the immediately adjacent rollers.

Thus the grid comprises two series of rollers, namely odd rollers and even rollers, all the rollers of the same series being identical and disposed in the same manner and alternating with the rollers of the other series which differ from the rollers of the first series only in respect of the positions of the discs.

It has been found that this arrangement of the rollers considerably improves machine operation, the rollers constituting in themselves a cleaning grid through which the grain can pass as well as the air from the fan. The rods as well as the notches formed on the periphery of the discs constitute driving meanes for the husk and chaff.

The invention is not limited to the particular dimensions given to the rollers or to the particular numbers of notches in the discs or numbers of rods for the roller. The following dimensions and other indications given by way of example have been found satisfactory:

| | Cm. |
|---|---|
| Outside diameter of the discs | 8 |
| Diameter of the cage | 6 |
| Four notches per disc | |
| Twelve rods per roller | |
| Spacing between the rods | 1.4 |
| Spacing between the discs | 4 |

Although specific embodiments of the invention have been described, many modifications and changes may be made therein without departing from the scope of the invention as defined in the appended claims.

Having now described my invention what I claim as new and desire to secure by Letters Patent is:

1. In a threshing mechanism for threshers and harvester-threshers, comprising a thresher cylinder, separating means and conveying means; grain cleaning means arranged at the outlet of the conveying means to receive grain, mixed with husk and chaff, from the separating means, said grain cleaning means comprising a rotary grid consisting of adjacent rotary rollers parallel with one another, each of said rollers comprising a rotative shaft, plates fixed on said shaft in planes substantially perpendicular to the latter and in spaced relation to one another, and rods parallel with said shaft and fixed to said plates so as to form a rigid cylindrical cage, the distance between the bars being suitable for the type of grain being treated, and roll driving means operatively connected to said shaft; said rollers of said rotary grid penetrating one another, each of the plates of a roller extending into the space between the plates of an immediately adjacent roller; said grain cleaning means further comprising grid rotating means operatively connected to said roll driving means.

2. In a threshing mechanism for threshers and harvester-threshers, comprising a thresher cylinder, separating means and conveying means; grain cleaning means arranged at the outlet of the conveying means to receive grain, mixed with husk and chaff, from the separating means, said grain cleaning means comprising a rotary grid consisting of adjacent rotary rollers parallel with one another, each of said rollers comprising a rotative shaft, plates fixed on said shaft in planes substantially perpendicular to the latter and in spaced relation to one another, and rods parallel with said shaft and fixed to said plates so as to form a rigid cylindrical cage, the distance between the bars being suitable for the type of grain being treated, and roll driving means operatively connected to said shaft; the periphery of said plates consisting of a series of evenly-spaced hollows and projections, the rollers of said rotary grid penetrating one another, each of the plates of a roller extending into the space between the plates of an immediately adjacent roller, and said rollers being fixed to their shafts in an angular direction relative to one another so that the projecting portions of the periphery of each plate face the hollow portions of the immediately adjacent rollers; said grain cleaning means further comprising grid rotating means operatively connected to said roll driving means.

References Cited in the file of this patent

UNITED STATES PATENTS

| | | | |
|---|---|---|---|
| 32,883 | Merrill | July 23, | 1861 |
| 171,725 | Hall | Jan. 4, | 1876 |
| 792,847 | Rettke | June 20, | 1905 |
| 826,988 | Bradbury | July 24, | 1906 |
| 2,351,567 | Welty | June 13, | 1944 |
| 2,395,163 | Carroll | Feb. 19, | 1946 |